United States Patent Office 2,811,563
Patented Oct. 29, 1957

2,811,563

NEW METHOD OF OXIDIZING β-CHLORO-ALLYL ALCOHOL TO β-CHLORO ACROLEIN

Renato Sollazzo and Alberto Vercellone, Milan, Italy, assignors to Società Farmaceutici Italia, a corporation of Italy No Drawing. Application October 12, 1955, Serial No. 540,175

Claims priority, application Italy October 28, 1954

2 Claims. (Cl. 260—603)

Our invention relates to a new method of oxidizing β-chloro-allyl alcohol to β-chloro-acrolein.

β-Chloro-acrolein is an important intermediate in the preparation of pyrimidine compounds obtained upon reacting it with materials containing a carbamidine group.

We first attempted to synthesize β-chloro-acrolein from β-chloro-allyl alcohol which, being commercially available, appeared to be a convenient starting material that should yield β-chloro-acrolein by means of a simple oxidation. However, we were unable to obtain the desired product, not even at low yields, by oxidizing β-chloro-allyl alcohol in the customary manner of converting primary alcohols to aldehydes by means of alkali bichromate in the presence of sulfuric acid. β-Chloro-acrolein was found to be exceptionally unstable. The oxygen content of even a small amount of air is sufficient to decompose it violently, whereby hydrochloric acid is liberated, together with the evolution of large amounts of heat.

It is the object of the present invention to provide a new and practical process of preparing β-chloro-acrolein at high yields by means of oxidizing β-chloro-allyl alcohol. Generally, the process consists in gradually adding dilute sulphuric acid to a heated mixture of precipitated manganese dioxide, sodium bisulfate and β-chloro-allyl alcohol, keeping the temperature between 50° C. and 65° C. by controlling the rate of addition and adjusting the vacuum applied from initially 540 mm./Hg to 180 mm./Hg at the end. In this manner, we perform simultaneously with the reaction a distillation of the β-chloro-acrolein in statu nascendi, as it were, and remove it thereby immediately from the detrimental influences of the reaction mixture. The entire operation is carried out in an inert gas stream and the β-chloro-acrolein is collected under water, from where it is drawn for direct further use, dissolved in 50% alcohol. The β-chloro-acrolein appears as a slightly yellowish, heavy liquid, practically insoluble in water and having a pungent odor which attacks the mucous membranes producing intense lachrymation; it decomposes almost instantaneously in contact with air. This decomposition is accompanied by the evolution of high amounts of heat, release of hydrochloric acid and polymerization of the product formed. It is note-worthy that this decomposition also takes place in 50% alcohol solution, but only after several days. Because of this instability, it is impossible to carry out an elementary analysis of the product but the constitution has been determined by reacting it with guanidine to obtain 2-amino-pyrimidine, the identity of which has been established by means of quantitative elementary analysis and determination of the melting point of the product as such and in admixture with standard 2-amino-pyrimidine.

The following example is given to further illustrate the present invention, without intending, however, to restrict its scope thereby:

Example

The preferred equipment consists of a 6000 cc. multiple neck flask, one of the openings being fitted with a vacuum-proof stirrer and another with a thermometer. A tube reaching close to the bottom of the flask for the purpose of introducing nitrogen is inserted into a third neck, while a fourth opening holds a tap funnel. Attached to the fifth neck is a Claisen connecting piece extending into a horizontal Dimroth cooler and provided with a thermometer to measure the temperature of the vapors. By means of a connecting piece the outlet of the cooler is connected with a tap funnel of 2000 cc. capacity to which a tube is applied for evacuating the device. All the joints are ground to fit. The flask is heated by means of a thermo-regulated oil bath.

187.5 g. of anhydrous $Na_2SO_4$
1500 g. of $H_2O$
124.5 g. of concentrated $H_2SO_4$ are introduced into the flask while stirring. After dissolution is complete 435 g. of precipitated $MnO_2$ are added in one portion. 225 g. of β-chloro-allyl alcohol are then added drop by drop from the tap funnel during a period of about 10 minutes. After all of the alcohol has been added, the temperature of the reaction mixture is brought to 52° C. and, while a vacuum of 540 mm./Hg is applied, the dropwise introduction of 1500 cc. 40% $H_2SO_4$ from the tap funnel is commenced. During the introduction of the acid which takes about 2 hours, a nitrogen stream is passed through the reaction mixture and the vacuum is gradually raised to 180 mm./Hg whereby care must be taken that the reaction temperature does not exceed 65° C. (bath temperature=75° C.). β-Chloro-acrolein distills gradually over and is collected under water in the tap funnel. Finally, the oily bottom layer is poured into 900 cc. of absolute alcohol containing 90 g. of $Na_2SO_4$. 144.3 g. of β-chloro-acrolein are obtained (theoretical yield 220.2 g.) which is equal to 65.5% based on the amount of β-chloro-allyl alcohol introduced.

We claim:
1. The process of preparing β-chloro-acrolein from β-chloro-allyl alcohol, which comprises oxidizing β-chloro-allyl alcohol at 50° to 65° C. under the atmosphere of an inert gas by means of manganese dioxide in the presence of an alkali bisulfate and an acid.
2. The process of preparing β-chloro-acrolein from β-chloro-allyl alcohol, which comprises adding β-chloro-allyl alcohol slowly to a mixture of manganese dioxide and an aqueous alkali bisulfate, applying a vacuum of 540 mm./Hg while heating to about 50° C., gradually adding about 40% sulfuric acid while increasing the vacuum to 180 mm./Hg, maintaining the temperature between 50° and 65° C., passing a stream of nitrogen through the reaction mixture, and collecting under water the β-chloro-acrolein distilling from the reaction mixture.

References Cited in the file of this patent

FOREIGN PATENTS 124,735     Sweden _____ Apr. 26, 1949